(12) United States Patent
Tremblay

(10) Patent No.: US 8,118,499 B2
(45) Date of Patent: Feb. 21, 2012

(54) INFRARED CAMERA ASSEMBLY SYSTEMS AND METHODS

(75) Inventor: Marcel Tremblay, Goleta, CA (US)

(73) Assignee: LIR Systems, Inc., Wilsonville, OR (US)

( * ) Notice: Subject to any disclaimer, the term of this patent is extended or adjusted under 35 U.S.C. 154(b) by 0 days.

(21) Appl. No.: 12/782,982

(22) Filed: May 19, 2010

(65) Prior Publication Data
US 2011/0286735 A1 Nov. 24, 2011

(51) Int. Cl.
*G03B 17/00* (2006.01)
(52) U.S. Cl. .................................. 396/427; 348/143
(58) Field of Classification Search .............. 396/427, 396/432; 348/95; 359/404, 407, 409, 480
See application file for complete search history.

(56) References Cited

U.S. PATENT DOCUMENTS

| | | | |
|---|---|---|---|
| 4,080,629 A * | 3/1978 | Hammond et al. | 348/373 |
| 4,394,692 A | 7/1983 | Randmae et al. | |
| 4,527,055 A * | 7/1985 | Harkless et al. | 250/234 |
| 4,652,930 A | 3/1987 | Crawford | |
| 4,777,527 A | 10/1988 | Camps et al. | |
| 4,795,908 A | 1/1989 | Morimoto et al. | |
| 4,843,461 A * | 6/1989 | Tatsumi et al. | 348/156 |
| 5,115,263 A | 5/1992 | Bernhardt et al. | |
| 5,444,507 A * | 8/1995 | Palmer | 396/421 |
| 5,444,568 A * | 8/1995 | Williams et al. | 359/400 |
| 5,455,625 A | 10/1995 | Englander | |
| 5,563,659 A * | 10/1996 | Bernhardt et al. | 348/373 |
| 5,610,656 A | 3/1997 | Bernhardt | |
| 5,864,365 A | 1/1999 | Sramek et al. | |
| 6,375,369 B1 * | 4/2002 | Schneider et al. | 396/427 |
| 6,536,961 B1 * | 3/2003 | Gillies | 396/427 |
| 6,549,650 B1 * | 4/2003 | Ishikawa et al. | 382/154 |
| 6,608,298 B2 * | 8/2003 | Gaber | 250/214 VT |
| 6,805,498 B2 | 10/2004 | Ford | |
| 6,830,387 B2 | 12/2004 | Rife | |
| 6,862,037 B2 * | 3/2005 | Lin | 348/151 |
| 6,956,610 B1 | 10/2005 | Walls | |
| 6,992,723 B1 * | 1/2006 | Wulf et al. | 348/374 |
| 7,321,120 B1 | 1/2008 | Gorman et al. | |
| 7,324,155 B2 | 1/2008 | Choo | |
| 7,362,372 B2 | 4/2008 | Lyon et al. | |
| 7,466,360 B2 | 12/2008 | Lee | |
| 7,520,686 B2 | 4/2009 | Droege et al. | |

(Continued)

FOREIGN PATENT DOCUMENTS

| | | |
|---|---|---|
| DE | G 95 10 660 | 7/1985 |
| EP | 1 575 265 | 9/2005 |

(Continued)

*Primary Examiner* — Clayton E LaBalle
*Assistant Examiner* — Warren Fenwick
(74) *Attorney, Agent, or Firm* — Haynes and Boone, LLP

(57) ABSTRACT

A camera assembly includes a housing having a central axis and a camera cassette slidably receivable in a front end thereof. The slide-in cassette includes a sled having a pair of legs slidably receivable in respective ones of a pair of complementary longitudinal slide guide recesses located in the housing and aligned substantially parallel to the central axis thereof, an electrical connector located at a rear end of the sled, a camera electrically coupled to the electrical connector, and an apparatus disposed at a front end of the sled for coupling the camera to the front ends of the sled and the housing such that the optical axis of the camera is located generally concentric with the central axis of the housing and disposed at a selectably adjustable angle relative thereto.

20 Claims, 5 Drawing Sheets

U.S. PATENT DOCUMENTS

| | | |
|---|---|---|
| 7,544,941 B2 | 6/2009 | Gorman et al. |
| 2001/0015766 A1 | 8/2001 | Marchesini |
| 2004/0048507 A1* | 3/2004 | Hage ............................ 439/332 |
| 2005/0094994 A1* | 5/2005 | Paolantonio et al. ......... 396/427 |
| 2008/0027591 A1* | 1/2008 | Lenser et al. ..................... 701/2 |
| 2009/0051763 A1* | 2/2009 | Adler et al. ...................... 348/65 |
| 2009/0109533 A1* | 4/2009 | Laganas et al. ............... 359/503 |

FOREIGN PATENT DOCUMENTS

| | | |
|---|---|---|
| FR | 2717607 | 9/1995 |
| JP | 5-223635 | 8/1993 |
| WO | WO 02/32089 | 4/2002 |
| WO | WO 03/077530 | 9/2003 |
| WO | WO 2007/021143 | 2/2007 |

* cited by examiner

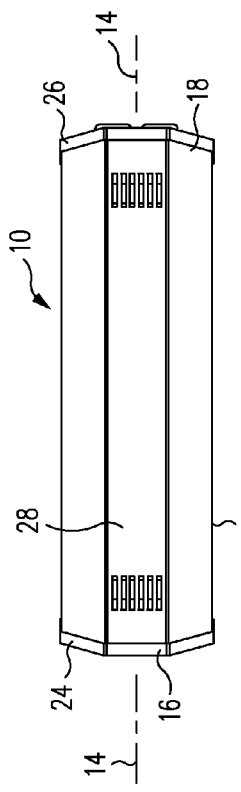
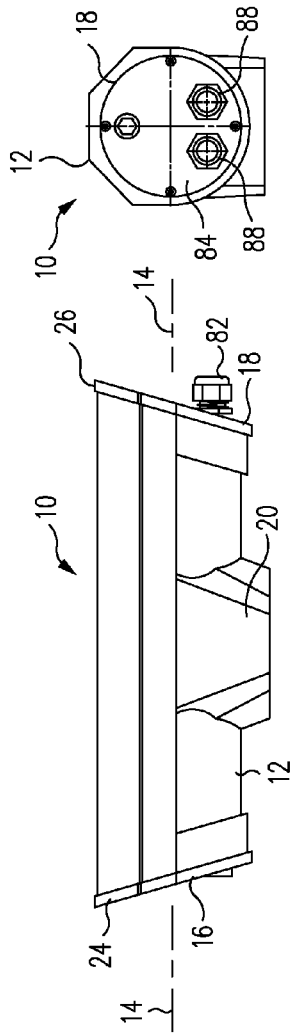
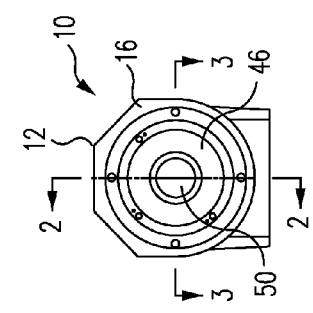
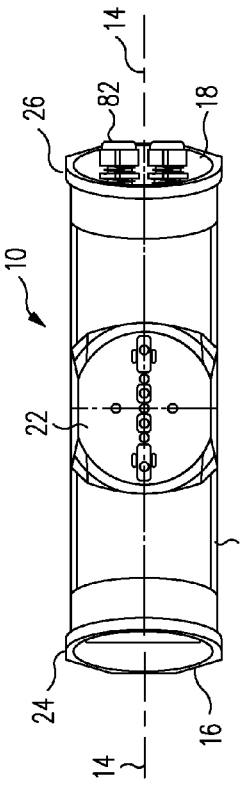
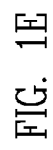
FIG. 1A
FIG. 1B
FIG. 1C
FIG. 1D
FIG. 1E

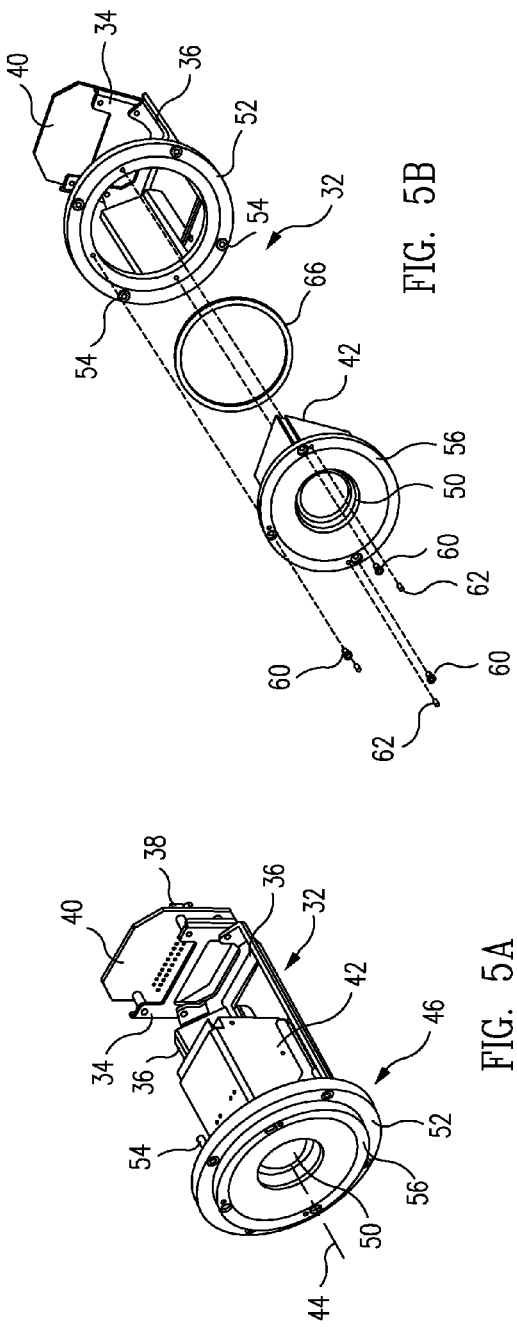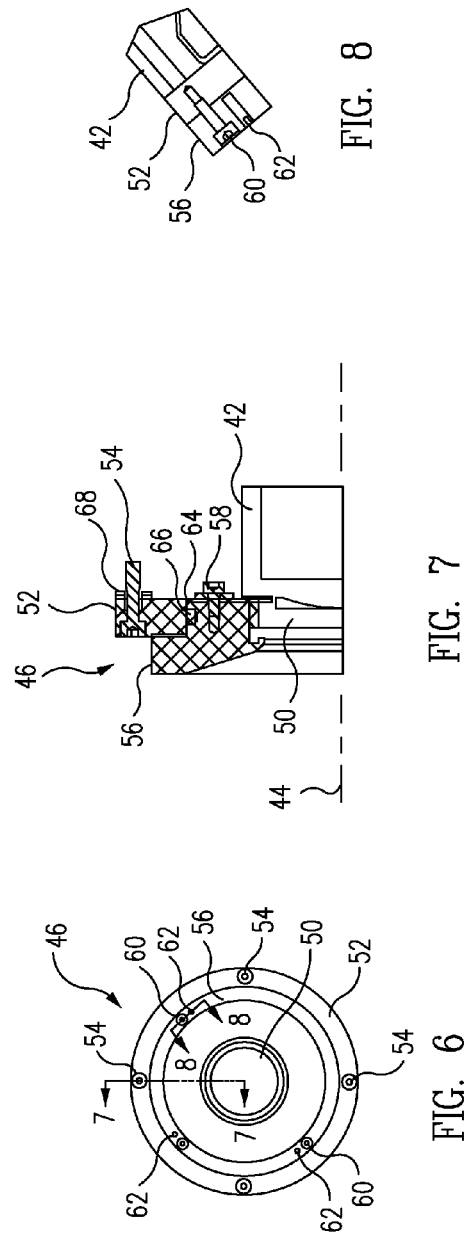

INFRARED CAMERA ASSEMBLY SYSTEMS AND METHODS

TECHNICAL FIELD

One or more embodiments of the invention relate generally to cameras, and more particularly, to cameras for use in, for example surveillance applications.

BACKGROUND

Cameras, such as for example, surveillance cameras, provide visual video images via "closed circuit" connections, which may be either wired or wireless, to enable a viewer to visually monitor relatively large, remote areas for a variety of purposes, including the provision of security, safety, and/or quality assurance of the monitored areas. Consequently, the number of applications for surveillance cameras has increased substantially in recent years, and has been accompanied by a corresponding advance in the various technologies pertaining to them.

Surveillance camera assemblies typically include a housing with a video camera and associated camera control, power supply, and image processing electronics mounted therein. They may comprise "fixed" view camera assemblies, i.e., those with a field of view (FOV) that is fixed or constant over time and that is established manually when the camera is initially installed. Alternatively, they may comprise "pan and tilt" camera assemblies that are coupled to pan and tilt mechanisms incorporating transducers, e.g., stepping motors, that are remotely controllable and operable to selectably vary at least one of the azimuth angle (pan) and the elevation angle (tilt) of the camera assembly relative to the horizon, and hence, its FOV, in real time.

In all practical surveillance camera applications, it is eventually necessary to effect repairs or maintenance of the various components of the camera assembly, particularly the camera component thereof. Since the camera component is typically not easily removable from the camera assembly in the field, and since the camera must eventually be "bore sighted," i.e., optically aligned, with the housing of the camera assembly for proper imaging, it is often necessary to remove and replace the entire camera assembly, including the housing, in order to effect a repair or maintenance operation on only one component thereof.

As a result, there is a need for improved camera assembly and field replacement techniques.

SUMMARY

In accordance with one or more embodiments, camera assemblies, such as for example, surveillance cameras, are provided that have components that are easily removable and replaceable in the field without having to remove and replace the entire camera assembly. For example, systems and methods may provide a replacement camera component that can be "pre-bore sighted" to the housing of the camera assembly at a remote repair or maintenance location before it is installed in the camera assembly in the field.

In accordance with one embodiment, a camera assembly useful for, e.g., surveillance applications, includes a housing having a central axis and a camera cassette slidably received in a front end thereof. The slide-in camera cassette includes a sled having a pair of legs slidably receivable in respective ones of a pair of complementary longitudinal slide guide recesses located in the housing and aligned substantially parallel to the central axis thereof. The camera cassette further includes an electrical connector located at a rear end of the sled, a camera electrically coupled to the electrical connector, and an apparatus disposed at a front end of the sled for coupling the camera to the front end of the housing such that the optical axis of the camera is located generally concentric with the central axis of the housing, and is disposed at a selectably adjustable angle relative thereto.

In accordance with another embodiment, a method for remotely "bore sighting" a camera assembly, i.e., for aligning the optical axis of a camera of the assembly relative to a central axis of a housing thereof at a location remote from the assembly, comprises providing a reference housing substantially identical to the camera housing but located remotely therefrom, and providing a target. The camera is installed into a front end of the reference housing and coupled thereto such that the optical axis of the camera is disposed generally concentric with the central axis of the reference housing. The camera is then used to form a focused image of the target on a display, and the angular orientation of the camera relative to the reference housing is manually adjusted until the center of the display is disposed at selected vertical and horizontal distances from the center of the target corresponding to a desired angular orientation of the optical axis of the camera relative to the central axis of the housing. The camera is then removed from the remote reference housing and installed into a front end of the camera housing and coupled thereto such that the optical axis of the camera is disposed generally concentric with the central axis of the camera housing. As a result, the optical axis of the camera is then disposed at the same angle relative to the central axis of camera housing as that to which it was previously set relative to the central axis of the reference housing. The target may, for example such as with binocular camera assemblies, be disposed at a distance sufficiently far away from the reference housing that light rays radiating from the target toward the camera are substantially parallel to each other.

The easy, slide-in interchangeability of the camera cassette and other components of the cameras assembly, coupled with the ability to "pre-bore sight" a replacement camera cassette at a remote location, eliminates the need to replace the entire camera assembly for repair or maintenance procedures and thereby significantly reduces costly camera assembly downtime.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1A-1E are top plan, left side elevation, bottom plan, front end elevation and rear end elevation views, respectively, of a camera assembly in accordance with an embodiment of the invention;

FIGS. 5A and 5B are perspective and exploded perspective views, respectively, of a camera cassette in accordance with an embodiment of the invention;

FIG. 6 is a front end elevation view of the camera cassette of FIGS. 5A-5B;

FIG. 7 is a partial cross-sectional view of the camera cassette as seen along the lines of the section 7-7 taken in FIG. 6;

FIG. 8 is a partial cross-sectional view of the camera cassette as seen along the lines of the section 8-8 taken in FIG. 6; and, FIGS. 9A-9C are upper front perspective, side elevation and rear end elevation views, respectively, of a binocular camera assembly in accordance with another embodiment of the invention.

Embodiments of the invention and their advantages are best understood by referring to the detailed description that follows. It should be appreciated that like reference numerals are used to identify like elements illustrated in one or more of the figures.

DETAILED DESCRIPTION

Figure 2:
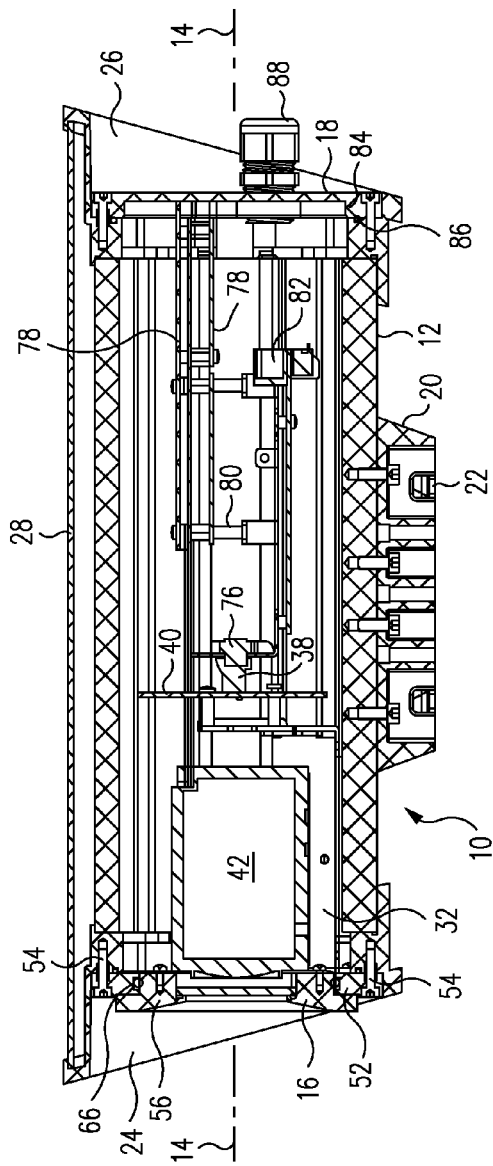
FIG. 2 is a cross-sectional view of the camera assembly as seen along the lines of the section 2-2 taken in FIG. 1D.
Figure 3:
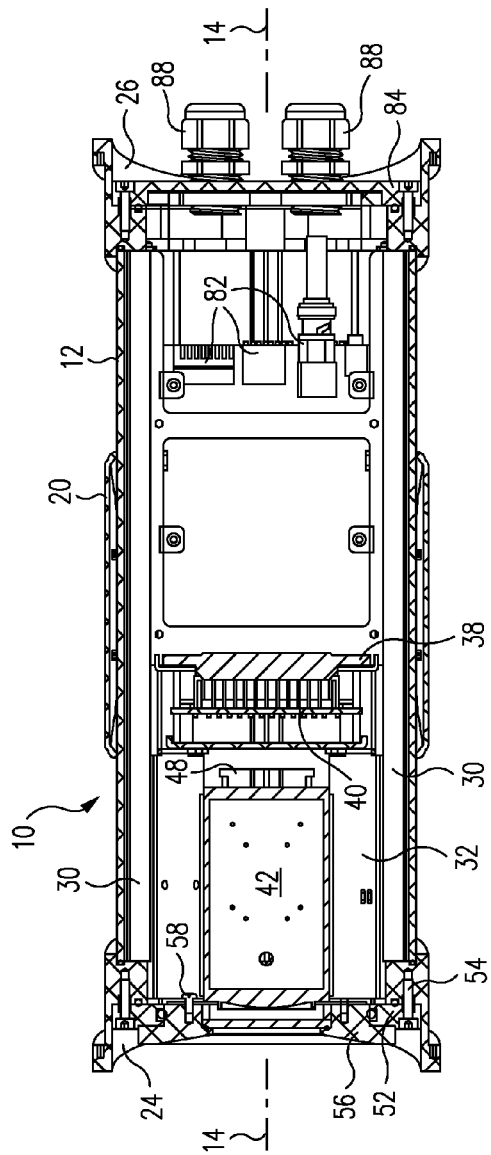
FIG. 3 is a cross-section view of the camera assembly as seen along the lines of the section 3-3 taken in FIG. 1D.
Figure 4:
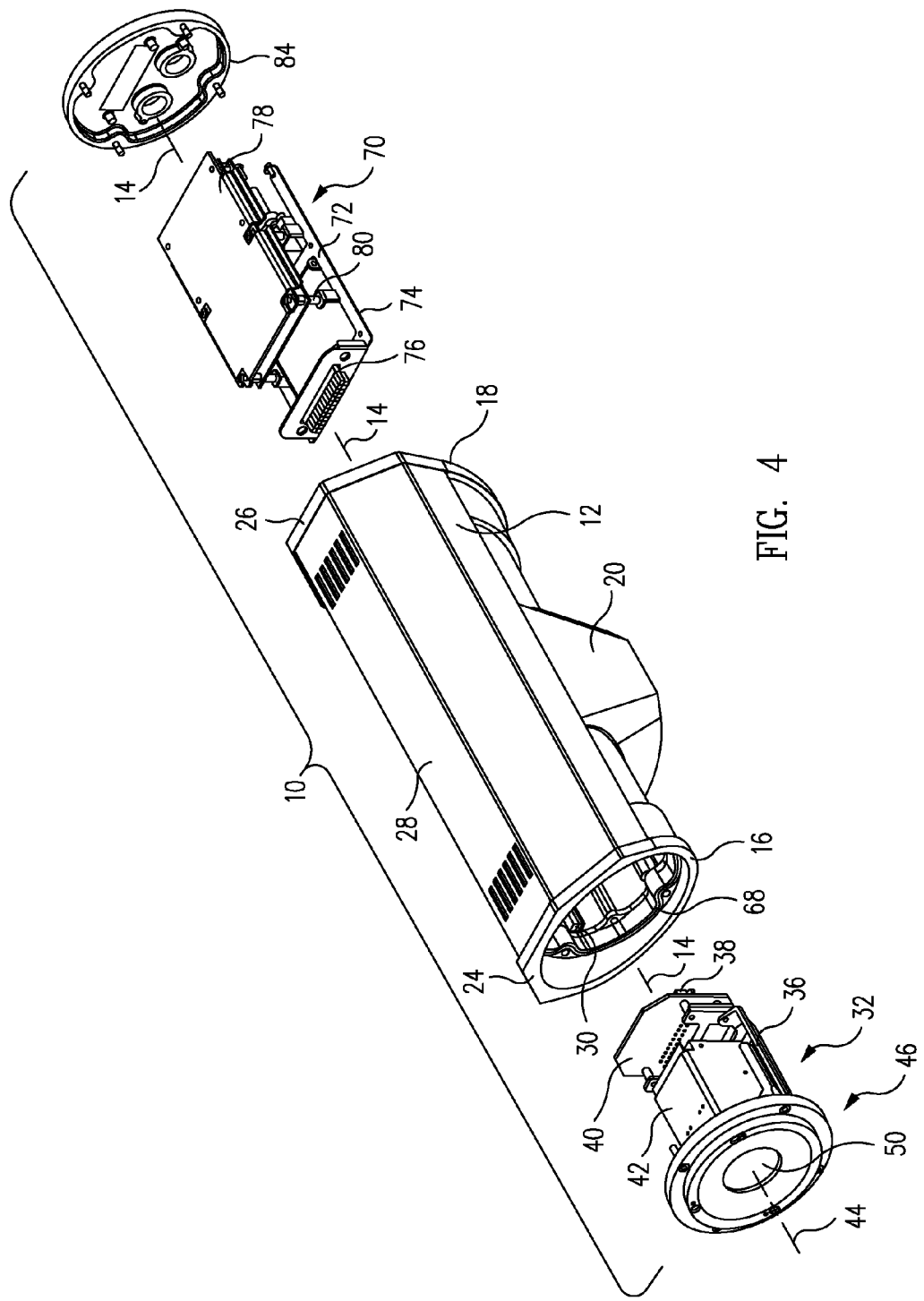
FIG. 4 is an exploded perspective view of the camera assembly of FIGS. 1A-1E.

FIGS. 1-4 show various views of an example embodiment of a camera assembly 10 in accordance with the present disclosure. As illustrated in FIG. 4, the camera assembly 10 comprises three main components, namely, an elongated tubular housing 12 having a central axis 14, a camera cassette 32 slidably received in a front end 16 of the housing 12, and an electronics cassette 70 slidably received in a rear end 18 of the housing 12.

As shown in FIGS. 1A-1E, the housing 12 of the camera assembly 10 may also include a mounting base 20 having a mounting interface 22 on a lower surface thereof configured for coupling the housing 12, and hence, the camera assembly 10, to a fixed platform or a pan and tilt mechanism (not illustrated) operable to selectably vary at least one of the azimuth angle (pan) and the elevation angle (tilt) of the camera assembly 10 relative to the horizon, and hence, its field of view (FOV). In a "fixed view" embodiment, this operation may be effected locally by, e.g., a manual adjustment of the position of the camera assembly 10 relative to, e.g., a mounting stanchion or pole (not illustrated). Alternatively, as described in more detail below, in a "pan and tilt view" embodiment, this operation may be effected from a remote location by remote control of transducers, e.g., stepping motors, disposed in the pan and tilt mechanism.

As illustrated in FIGS. 2 and 3, for use in an exterior setting, the housing 12 of the camera assembly 10 may additionally be provided with beveled-end front and rear end caps 24 and 26 that act as visors that protect components respectively located at the front and rear ends 16 and 18 of the housing 12 against rain and glare from an overhead sun. Additionally, the housing 12 may include a sun shield, for example, a thin, vented sheet metal enclosure or jacket 28 that wraps around and is spaced apart from the housing 12, to shade the housing 12 from direct radiation from the sun and thereby protect it and its electronic contents from being overheated by the sun.

As illustrated in FIGS. 3 and 4, the housing 12 also includes an advantageous mechanism for enabling the camera cassette 32 and the electronics cassette 70 to be respectively received in the front and rear ends 16 and 18 of the housing 12 in an easily effected slide-in, slide out fashion. In the particular embodiment illustrated in the figures, this mechanism comprises a pair of longitudinal slide guide recesses 30 located on the inner surfaces of opposite side walls of the housing 12, and which are aligned substantially parallel to the central axis 14 thereof. In some embodiments, the guide recesses 30 can be formed integrally into the walls of the housing 12, for example, as in an extruded housing 12. Alternatively, the guide recesses 30 can be manufactured separately, as in a four-slide sheet metal process, and then attached to the interior walls of the housing 12 in parallel alignment with the central axis 14 thereof. Additionally, as those of skill in the art will appreciate, other cassette slide-in guiding arrangements are known and can be also used in place of the particular guide recesses 30 illustrated.

The housing 12 may be fabricated by a wide variety of manufacturing processes, including extruding, casting or injection molding techniques, and may be fabricated from a large variety of materials, including strong, light weight metals, for example, aluminum alloys, such as 6061 T6 aluminum alloy, or alternatively, of thermosetting or thermoplastic materials, which may, if desired, be internally reinforced by fibrous reinforcement materials, such as fiberglass or carbon fiber meshes, for added strength.

As illustrated in FIGS. 5A and 5B, the slide-in camera cassette 32 of the camera assembly 10 comprises an elongated camera sled 34 having a pair of elongated runners, or legs 36 disposed on opposite sides thereof. Each of the legs 36 is configured to be slidably received in a respective one of the complementary longitudinal slide guide recesses 30 of the housing 12 described above so as to support and position the camera cassette 32 radially therein. In one advantageous embodiment, the camera sled 34, including the legs 36, may be fabricated as an assembly of die-stamped sheet metal parts.

The camera cassette 32 further includes a camera cassette electrical connector 38 located at a rear end of the camera sled 34. In the particular embodiment illustrated, the camera cassette electrical connector 38 is mounted on and electrically connected to a printed circuit board (PCB) 40 disposed orthogonally to the long axis of the camera sled 34 at the rear end thereof, which is used both to position the camera cassette connector 38 appropriately to mate in a complementary plug-in engagement with an electrical connector 76 disposed at a front end of the electronics cassette 70, as illustrated in the cross-sectional views of FIGS. 2 and 3, as well as to electrically interconnect a camera 42 of the camera cassette 32 with the camera cassette electrical connector 38.

The camera 42 of the camera assembly 10 has an optical axis 44, as illustrated in FIGS. 4 and 5A, and is coupled to the camera sled 34 and the housing 12 by means of a camera coupling apparatus 46 so that the camera 42, and hence, the optical axis 44 thereof, is selectably moveable through a small conical angle relative to the camera sled 34, and hence, relative to the central axis 14 of the housing 12, as described in more detail below. The camera 42 may be electrically coupled to the camera cassette connector 38 via the PCB 40 on which the camera connector 38 is mounted by means of, for example, a flexible wiring harness (not illustrated) extending between a connector 48 disposed on the back end of the camera 42 (see FIG. 3) and the PCB 40. The camera 42 may comprise, for example, an infrared (IR), a black and white, a night vision device (NVD), or a color video camera, all of known types in the industry and useful for either fixed or pan and tilt view applications, and may include optics 50 that enable the camera 42 to focus on an object, and optionally, to zoom in on it optically, both in a known manner.

As illustrated in FIGS. 5-8, the camera coupling apparatus 46 is mounted at the front end of the camera sled 34 and is used both for coupling the camera cassette 32 and camera 42 to the front end 16 of the housing 12, and for bore sighting the camera 42 in the housing 12, that is, for positioning the camera 42 relative to the housing 12 such that the optical axis 44 of the camera 42 is located generally concentric with the central axis 14 of the housing 12 and is disposed at a selected angle relative thereto. As discussed in more detail below, this bore sighting procedure can be effected locally, i.e., at the location of the camera assembly 10, or advantageously, at a remote location, using a "reference" housing.

With reference to FIGS. 5-8, the camera coupling apparatus 46 comprises an annular first, or camera cassette, ring 52 having a central opening therein that is coupled to the front end of the camera sled 34, and which in turn is coupled to the front end 16 of the housing 12 by a first plurality of fasteners 54 such that the central opening of the first ring 52 is disposed generally concentric with the central axis 14 of the housing 12. The camera coupling apparatus 46 also includes an annular second, or camera window, ring 56 that also includes a central opening therein. As illustrated in FIG. 7, the camera 42 is mounted on a rear surface of the second ring 56, for example, with fasteners 58, such that the optical axis 44 of the camera 42 is disposed generally concentric with the central opening of the second ring 56.

As illustrated in FIGS. 5B, 6, and 8, a second plurality of fasteners 60 is used to couple the second ring 56 to a front surface of the first ring 52 such that the central opening of the second ring 56 is disposed generally concentric with the central opening of the first ring 52. Further, the optical axis 44 of the camera 42 is disposed generally concentric with the central axis 14 of the housing 12 at the front end 16 thereof, thereby satisfying one of the goals of the bore sighting operation.

The second goal of the bore sighting operation, namely, the adjustment of the angle between the optical axis 44 of the camera 42 and the central axis 14 of the housing 12 to a selected value, may be effected by means of an angle adjustment mechanism comprising three small "set" or threaded adjustment screws 62 disposed in openings in the second ring 56 and having respective distal ends contacting a front surface of the first ring 52. Axial movement of the adjustment screws 62 within the second ring 56 exerts a force between the two rings 52 and 56 and thereby adjusts the angle defined between the first ring 52 and the second ring 56. Further, the axial movement of the adjustment screws 62 adjusts the angle between the optical axis 44 of the camera 42 and the central axis 14 of the housing 12 to the particular angular value desired.

A small clearance 64 is provided between the first and second rings 52 and 56, as illustrated in FIG. 7. Then, when the second plurality of fasteners 60 coupling the second ring 56 to the first ring 52 are loosened slightly, the second ring 56 becomes free to pivot through a small conical angle relative to the first ring 52. The adjustment screws 62 may then be respectively turned clockwise or counterclockwise so as to selectively advance or retract them within the second ring 56 until the desired angular relationship between the optical axis 44 of the camera 42 and the central axis 14 of the housing 12 is obtained, in a procedure described in more detail below. The fasteners 60 coupling the second ring 56 to the first ring 52 can then be re-tightened so that the desired bore sight angle thereby obtained is "fixed" or maintained in the camera assembly 10.

As may be seen from the foregoing description, the camera 42 "floats" positionally relative to the camera cassette 32 by virtue of the indirect coupling thereto provided by the camera coupling apparatus 46. Thus, both the concentricity of the optical axis 44 of the camera 42 with respect to the central axis 14 of the housing 12, and the angular relationship between the two axes 44 and 14, is precisely controlled at the front end 16 of the housing 12 exclusively by the camera coupling apparatus 46, and is independent of the radial position of the camera cassette 32 in the housing 12. Thus, the camera sled 34, the elongated legs 36 thereof, and the complementary longitudinal slide guide recesses 30 of the housing 12 are not critical for registration and bore sighting of the camera 42 within the camera assembly 10, enabling the dimensional tolerances applied to these features to be relaxed and resulting in reduced manufacturing costs.

For protection against the entry of contaminants, e.g., moisture, into the camera assembly 10, a seal may be provided between the camera cassette 32 and the housing 12 at the front end 16 thereof. In the particular embodiment illustrated, this front end seal may be effected in two parts. In a first part, a seal may be disposed between first and second rings 52 and 56, such as an elastomeric O-ring 66, as illustrated in FIGS. 5B and 7, which enables a seal to be maintained during relative pivotal movement of the two rings 52 and 56. In a second part, a second seal may be disposed between the first ring 52 and the housing 12, such as an elastomeric O-ring (with cutouts around the fasteners 54), or a flat, elastomeric gasket 68, as illustrated in FIG. 4 (e.g., routed on the inner diameter relative to fasteners 54).

To provide electrical control, power and image processing capabilities to the camera assembly 10, a camera assembly electronics cassette 70 is slidably received into the rear end 18 of the housing 12. As illustrated in FIGS. 2-4, the electronics cassette 70, like the camera cassette 32 described above, includes an elongated electronics cassette sled 72 having a pair of elongated runners or legs 74 slidably received in respective ones of the internal longitudinal slide guide recesses 30 of the housing 12 described above. Like the camera cassette sled 34, the electronics cassette sled 72 may also be fabricated as a relatively inexpensive assembly of die-stamped sheet metal parts.

To provide electrical connection with the camera cassette 32, the electronics cassette 70 is provided with an electronics cassette electrical connector 76 located at a front end of the electronics sled 72, which is adapted to mate with the electrical connector 38 of the camera cassette 32 in a complementary plug-in engagement, as illustrated in, e.g., FIG. 2. To this end, the camera cassette electrical connector 38 may be provided with a chamfer at its rear or mating end, and the electronics cassette electrical connector 76 may mounted so as to float on the sled 72 of the electronics cassette 70 so as to provide leeway for blind engagement with the camera cassette electrical connector 38.

To effect the above camera assembly 10 electrical control, power and imaging functions, the electronics cassette 70 is provided with at least one printed circuit board (PCB) 78 implementing these functions, which is mounted on the electronics sled 72 and electrically coupled to the electrical connector 76 of the electronics cassette 70 via, for example, a conventional wiring harness (not illustrated). In the particular embodiment illustrated in FIGS. 2-4, the control, power and image processing PCB 78 comprises a pair of PCBs 78 mounted to the electronics cassette 72 on stand-offs 80 in a stacked or "mezzanine" arrangement. As illustrated in FIG. 3, a variety of connectors 82, e.g., BNC, RCA, Cat. 5, multi-pin DC connectors, test probe sockets, and the like, may be mounted at the rear ends of one or more of the PCBs 78 to enable temporary or permanent electrical connections to be made to the camera assembly 10 (e.g., for local testing and maintenance activities).

The rear end 18 of the housing 12 may be closed off by a rear end plate 84 that effects a seal with the housing 12 by means of a gasket 86 (see, e.g., FIG. 2), such as an elastomeric O-ring, disposed between the rear plate 84 and the housing 12, and which is removable to effect local connection with the camera assembly 10 via the internal electrical and test access connectors 82 described above. Camera assembly 10 control, power, and image signals may be conveyed to and from the camera assembly 10 by way of one or more conventional wiring harnesses (not illustrated) that enter the housing 10 through the rear plate 84 via a pair of hermetically sealing connection ports 88, as illustrated in, e.g., FIGS. 2 and 3.

As may be seen from the foregoing discussion, for purposes of repair or maintenance of a camera assembly 10 located in the field, either one or both of the camera cassette 32 and the electronics cassette 70 can be easily and quickly removed from the camera assembly 10 and replaced with replacement cassettes in a plug-out, plug-in fashion without having to replace the entire camera assembly 10. However, as discussed above, it is necessary for proper functioning of the camera assembly 10 that the camera 42 be bore sighted in the housing 12 relatively accurately, i.e., such that the optical axis 44 of the camera 42 is located generally concentric with the central axis 14 of the housing 12 and is disposed at a selected angle relative thereto.

During assembly of the camera assembly 10 at the factory, bore sighting of the camera 42 within the housing 12 may be effected using the following method. For example, a target is provided at a desired distance and location from camera assembly 10. The specific distance and/or location, for example, may depend on the specific optics and related components of camera 42 and the desired angular orientation and/or bore sighting operation desired. As a specific example, if camera assembly 10 is part of a binocular camera assembly, the target may be located at a distance sufficiently far away from the camera assembly 10 that light rays radiating from the target toward the camera assembly 10 are disposed substantially parallel to each other, i.e., such that the target is effectively located an "infinite" distance away from the binocular camera assembly. The camera 42 is installed into the front end 16 of the housing 12 and coupled thereto using the coupling apparatus 46 such that the optical axis 44 of the camera 42 is disposed generally concentric with the central axis 14 of the housing 12.

The camera 42 is then switched on and used to form a focused image of the target on a video monitor or display, such as a cathode ray tube (CRT) or a liquid crystal (LCD) display. The angular orientation of the camera 42 relative to the housing 12 is then adjusted using the adjustment screws 62 of the camera coupling apparatus 46 as described above until the center of the display is disposed at selected vertical and horizontal distances from the center of the target corresponding to a desired angular orientation of the optical axis 44 of the camera 42 relative to the central axis 14 of the housing 12. For example, if the desired relative angle is zero degrees, i.e., if it is desired that the optical axis 44 of the camera 42 be substantially coaxial with the central axis 14 of the housing 12, then the angular position of the camera 42 is adjusted with the adjustment screws 62 until the display is centered on the target.

A similar method can be used advantageously to "pre-bore sight" a replacement camera cassette 32 for use in the camera housing 12 of a camera assembly 10 already located in the field. In this method, a "reference housing" that is substantially identical to the camera housing 12 is provided at a location remote from the location of the camera assembly 10 in the field, for example, at an assembly, repair or maintenance facility. The camera 42 of the replacement cassette 32 is first bore sighted within the reference housing in accordance with the preceding method, then removed from the reference housing and installed in the housing 12 of the remotely located camera assembly 10 in place of the old camera cassette 32 installed therein. When the replacement cassette 32 is coupled to the front end 16 of the housing 12 of the camera assembly 10 with the camera coupling apparatus 46, the camera 42 will then will be bore sighted to the housing 12, that is, the optical axis 44 of the camera 42 will be disposed generally concentric with the central axis 14 of the housing 12 and at the same selected angle relative thereto that was previously established in the remote reference housing.

Figure 9A:
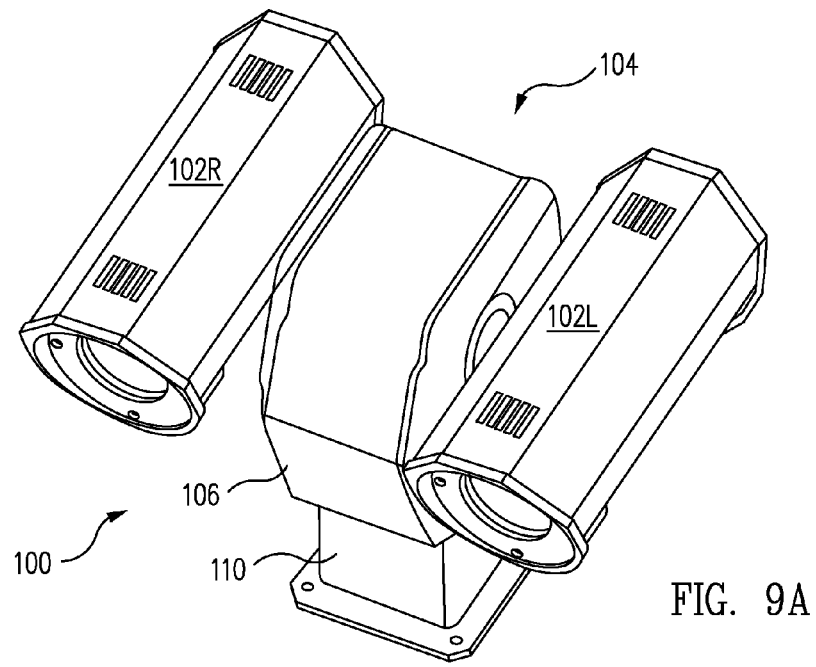
Figure 9B:
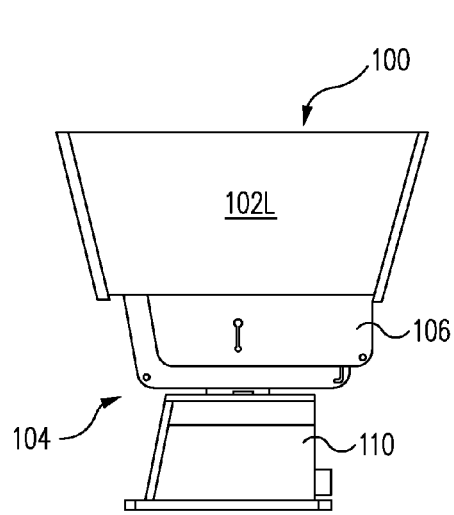
Figure 9C:
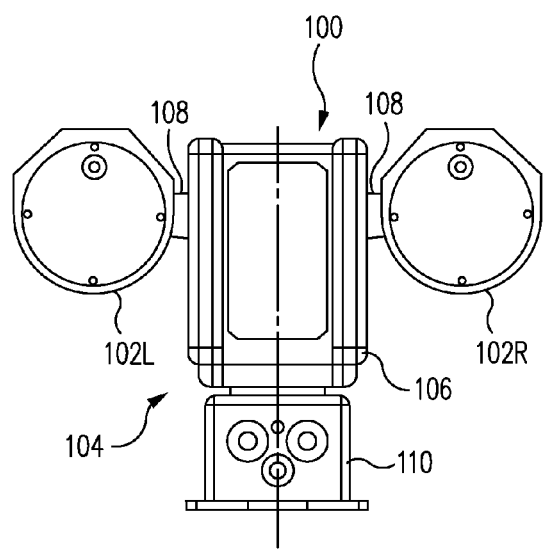

FIGS. 9A-9C are upper front perspective, side elevation and rear end elevation views, respectively, of a binocular camera assembly 100 in accordance with another embodiment of the present invention. As illustrated in FIGS. 9A-9C, the binocular camera assembly 100 comprises a pair of camera assemblies 102R and 102L, each of which is configured substantially in accordance with the camera assembly 10 described above, and a pan and tilt mechanism 104 coupled to the respective housings of the two camera assemblies 102R and 102L such that the respective optical axes of the respective cameras of the two camera assemblies are spaced apart laterally from and aligned parallel to each other. It should be understood, however, that binocular camera assembly 100 is not limited to an implementation with pan and tilt mechanism 104, but rather camera assemblies 102R and 102L may also be implemented with a stationary or fixed (i.e., non-pan/tilt) support structure in accordance with one or more embodiments.

In the particular embodiment illustrated, the pan and tilt mechanism 104 includes two parts, an upper part 106 to which each of the camera assemblies 102R, 102L is rotatably mounted by an associated arm 108 for conjoint vertical rotational, or tilting movement, thereof. The upper part 106 is in turn rotatably mounted on a lower or base part 110 that is adapted to mount to, e.g., a fixed platform, such as a mounting pole or stanchion (not illustrated), and which is operable to conjointly rotate, or pan, the upper part 106 and the two camera assemblies 102R and 102L in the horizontal direction conjointly with each other. In one possible embodiment adapted to provide reliable imaging in both bright light and reduced light conditions, the camera of one of the pair of camera assemblies 102R and 102L may comprise an infrared (IR) video camera, and the camera of the other camera assembly may comprise, e.g., a black and white, a night vision device (NVD), or a color video camera. The images produced by the respective cameras may be remotely displayed side-by-side with each other, or in a stereoscopic or three-dimensional embodiment, may be superimposed on one another on a display.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A camera assembly, comprising:
   a housing having a central axis; and,
   a camera cassette slidably receivable in a front end of the housing, including:
   a camera sled having a pair of legs slidably receivable in respective ones of a pair of complementary longitudinal slide guide recesses located within the housing and aligned substantially parallel to the central axis thereof such that the sled is received within the housing at a predetermined, fixed angular orientation relative thereto;

a camera cassette electrical connector located at a rear end of the camera sled;

a camera electrically coupled to the camera cassette connector and having an optical axis; and, a camera coupling apparatus disposed at a front end of the camera sled for coupling the camera to the front end of the housing such that the optical axis of the camera is located generally concentric with the central axis of the housing and disposed at a selectably adjustable angle relative thereto.

2. The camera assembly of claim 1, wherein the camera coupling apparatus comprises:

a first annular ring coupled to the front end of the camera sled and having a central opening therein;

a first plurality of fasteners coupling the first ring to the front end of the housing such that the central opening of the first ring is disposed generally concentric with the central axis of the housing;

a second annular ring having a central opening, the camera being mounted on a rear surface thereof such that the optical axis of the camera is disposed generally concentric with the central opening of the second ring;

a second plurality of fasteners coupling the second ring to the first ring such that the central opening of the second ring is disposed generally concentric with the central opening of the first ring and the optical axis of the camera is disposed generally concentric with the central axis of the housing; and, an angle adjustment mechanism for adjusting the angle between the optical axis of the cam-era and the central axis of the housing to a selected value.

3. The camera assembly of claim 2, wherein the angle adjustment mechanism comprises three adjustment screws disposed in the second ring and having respective distal ends contacting the first ring such that selected axial movement of the adjustment screws within the second ring adjusts the angle between the optical axis of the camera and the central axis of the housing to the selected value.

4. The camera assembly of claim 1, wherein the camera is electrically coupled to the cam-era cassette electrical connector via at least one of a flexible wiring harness and a printed circuit board.

5. The camera assembly of claim 1, further comprising a seal disposed between the camera cassette and the housing.

6. The camera assembly of claim 5, wherein the seal comprises:

a gasket disposed between the first ring and the housing; and, an O-ring disposed between the second ring and the first ring.

7. The camera assembly of claim 1, further comprising an electronics cassette slidably received in a rear end of the housing, including:

an electronics cassette sled having a pair of legs slidably receivable in respective ones of the pair of longitudinal slide guide recesses in the housing;

an electronics cassette electrical connector located at a front end of the electronics sled and disposed in complementary plug-in engagement with the electrical connector of the camera cassette; and, at least one printed circuit board mounted on the electronics sled and electrically couplable to the electrical connector of the electronics cassette.

8. The camera assembly of claim 7, further comprising:

a rear end plate coupled to and closing off the rear end of the housing; and, a sealing gasket disposed between the rear end plate and the housing.

9. The camera assembly of claim 1, wherein the camera comprises an infrared, a black and white, a night vision device (NVD), or a color video camera.

10. The camera assembly of claim 1, wherein the camera includes optics capable of at least one of focusing and zooming.

11. The camera assembly of claim 1, further comprising a pan and tilt mechanism coupled to the housing and operable to vary at least one of an azimuth angle and an elevation angle of the optical axis of the camera.

12. The camera assembly of claim 11, wherein the pan and tilt mechanism is remotely operable.

13. A method for aligning the optical axis of the camera of claim 1 with the central axis of the housing thereof, the method comprising:

providing a target;

installing the camera into the front end of the housing and coupling it thereto using the coupling apparatus such that the optical axis of the camera is disposed generally concentric with the central axis of the housing;

forming a focused image of the target on a display using the camera; and, adjusting an angular orientation of the camera relative to the housing the camera coupling apparatus until the center of the display is disposed at selected vertical and horizontal distances from the center of the target corresponding to a desired angular orientation of the optical axis of the camera relative to the central axis of the housing.

14. A method for aligning the optical axis of the camera of claim 1 relative to the central axis of the camera housing, the method comprising:

providing a reference housing substantially identical to the camera housing;

providing a target;

installing the camera into a front end of the reference housing and coupling it thereto such that the optical axis of the camera is disposed generally concentric with the central axis of the reference housing;

forming a focused image of the target on a display using the camera;

adjusting an angular orientation of the camera relative to the reference housing until the center of the display is disposed at selected vertical and horizontal distances from the center of the target corresponding to a desired angular orientation of the optical axis of the camera relative to the central axis of the housing; and, removing the camera from the reference housing such that, when the camera is installed into a front end of the camera housing and coupled thereto, the optical axis of the camera is disposed generally concentric with the central axis of the camera housing and the optical axis of the camera is disposed at the selected angle relative to central axis of the camera housing.

15. A binocular camera assembly, comprising:

a pair of camera assemblies, each in accordance with the camera assembly of claim 1; and, a pan and tilt mechanism coupled to the respective housings of the camera assemblies such that the respective optical axes thereof are spaced apart laterally from and aligned parallel to each other, the pan and tilt mechanism being operable to pan and tilt the camera assemblies conjointly with each other.

16. The binocular camera assembly of claim 15, wherein the camera of one of the pair of camera assemblies comprises an infrared video camera and the camera of the other camera assembly comprises a black and white, a night vision device (NVD), or a color video camera.

17. A slide-in cassette for a camera assembly, comprising:
a sled having a pair of legs configured to be slidably receivable in respective ones of a pair of complementary longitudinal guide recesses of the camera assembly such that the sled is received within the camera assembly at a predetermined, fixed angular orientation relative thereto;
an electrical connector disposed at a rear end of the sled;
a first annular ring coupled to a front end of the sled and having a central opening there-in;
a second annular ring having a central opening therein and being coupled to a front surface of the first ring such that the respective central openings of the two rings are disposed generally concentric to each other;
a camera electrically couplable to the electrical connector and mounted to the second ring such that an optical axis of the camera is disposed generally concentric with the respective central openings of the first and second rings; and,
an angle adjustment mechanism for selectably adjusting an angle between the first and second rings to a selected value.

18. The slide-in cassette of claim 17, wherein the angle adjustment mechanism comprises:
three adjustment screws disposed in the second ring and having respective distal ends contacting the first ring such that selected axial movement of the adjustment screws within the second ring adjusts an angle subtended between the first and second rings to the selected value.

19. The slide-in cassette of claim 17, wherein the electrical connector is electrically coupled to a printed circuit board and the camera is electrically coupled to the printed circuit board via a flexible wiring harness.

20. The slide-in cassette of claim 17, wherein the camera comprises an infrared, a black and white, a night vision device (NVD), or a color video camera, and includes optics capable of at least one of focusing and zooming.

* * * * *

UNITED STATES PATENT AND TRADEMARK OFFICE
CERTIFICATE OF CORRECTION

| | | |
|---|---|---|
| PATENT NO. | : 8,118,499 B2 | Page 1 of 1 |
| APPLICATION NO. | : 12/782982 | |
| DATED | : February 21, 2012 | |
| INVENTOR(S) | : Marcel Tremblay | |

It is certified that error appears in the above-identified patent and that said Letters Patent is hereby corrected as shown below:

On the face of the patent, (73) Assignee:

Change "LIR Systems, Inc., Wilsonville, OR (US)" to -- FLIR Systems, Inc., Wilsonville, OR (US) --

Signed and Sealed this
Twelfth Day of February, 2013

Teresa Stanek Rea
*Acting Director of the United States Patent and Trademark Office*